Patented Oct. 21, 1952

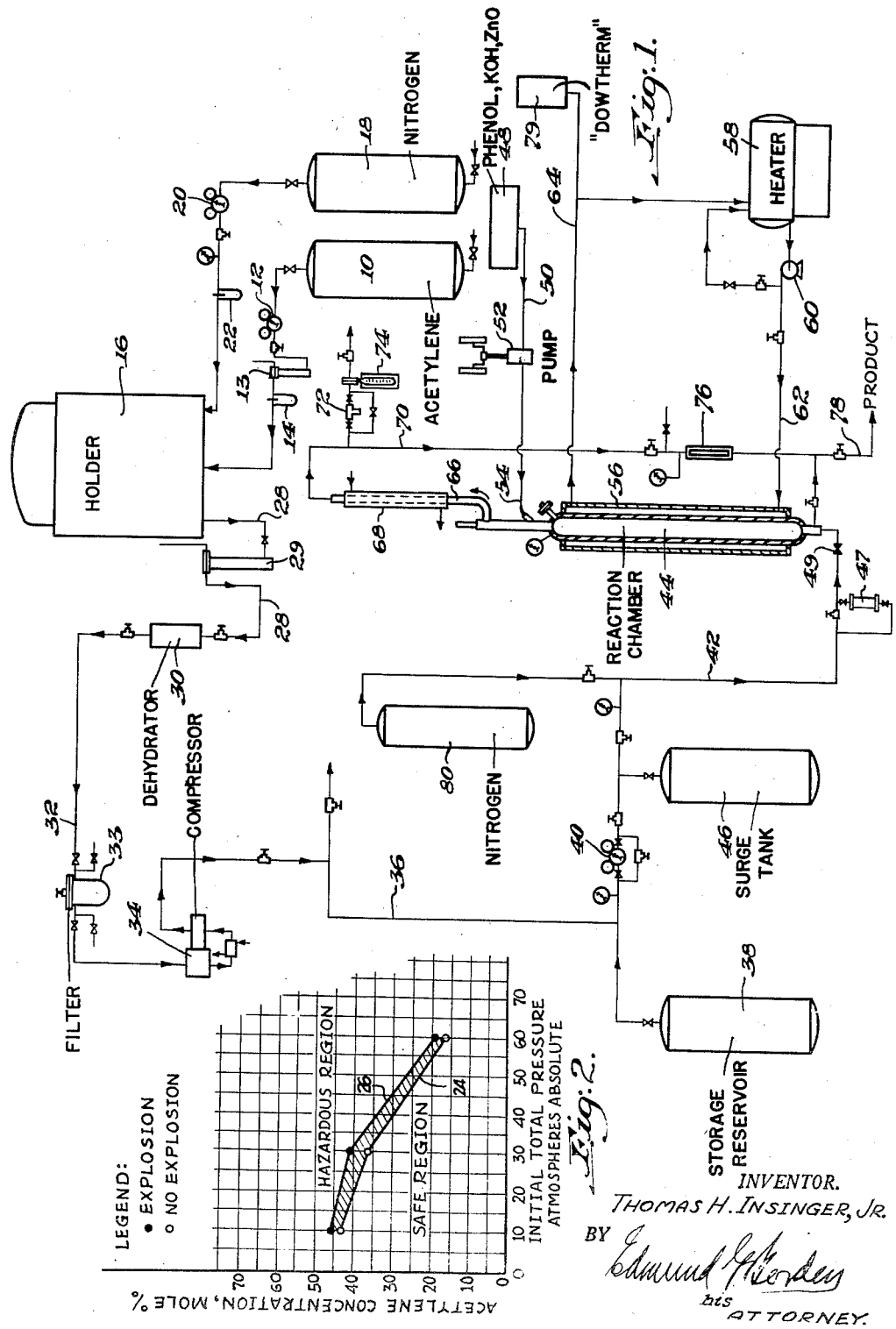

2,615,050

UNITED STATES PATENT OFFICE 2,615,050

VINYL ETHERS

Thomas H. Insinger, Jr., Pittsburgh, Pa., assignor to Koppers Company, Inc., Pittsburgh, Pa., a corporation of Delaware Application September 24, 1947, Serial No. 775,945

16 Claims. (Cl. 260—612)

This invention relates to the manufacture of vinyl ethers. More particularly, the invention relates to the production of vinylaryl ethers by the reaction of acetylene with thermally and alkali stable alcohols and phenols.

United States Patent 1,959,927 to Reppé granted May 22, 1934 describes the reaction of acetylene with monomeric hydroxy compounds free from alkali sensitive groups and corresponding to the formula

in which X represents either —H, —COOH, —COO-metal, —NY$_2$, —(OR)$_n$—OH or

—(OR)$_n$—OR groups, R being an aliphatic, hydroaromatic, aromatic or aralkyl radicle, Y being —H, —R or —ROH and $n$ being nought or any integral number in the presence of a strongly alkaline medium such as the alkali metal hydroxides. In the described reaction many examples are cited in which 15 to 36 hours are required to complete the reaction. When the reaction defined by Reppé is applied to the vinylation of phenol the ultimate yield of vinylphenyl ethers is reduced due to secondary reactions which take place when a long time period is used in carrying on the reaction. For example, phenol and vinylphenyl ether (the vinylphenyl ether being the primary reaction product), react to produce acetaldehyde diphenylacetal and other high molecular weight compounds.

I have discovered that the rate of reaction of acetylene with thermally and alkali stable alcohols and phenols may be greatly increased and a satisfactory yield obtained if the alkali metal hydroxide is used in combination with one or a mixture of oxides of certain metals of the second group of the periodic table, such as zinc oxide (ZnO) and cadmium oxide (CdO) as the catalyst.

The primary object of the present invention is to provide a process in which the rate of reaction of acetylene with a thermally and alkali stable alcohol or phenol may be greatly increased increased while obtaining a satisfactory yield.

Another object of the invention is to provide a process of vinylating phenols with the aid of a catalyst made up of an alkali metal hydroxide and an oxide of a metal of the second group of the periodic table.

In accordance with this object, I have found that the formation of secondary reaction products, such as diphenyl acetal may be minimized if the reaction is carried out in the presence of an inert solvent. The presence of an inert solvent provides improved control of the process and results in greater yields of the desired primary products of reaction.

Therefore another object of the invention is to provide a process of vinylating thermally and alkali stable alcohols and phenols with a catalyst complex made up of alkali metal hydroxide with zinc oxide or cadmium oxide in the presence of a neutral solvent.

I have also found that the above described vinylation reaction may be carried out with increased rate if the reaction is carried out under pressure. Many tests have shown that the best results are obtained when the ratio of the zinc oxide to alkali metal hydroxide or cadmium oxide to alkali metal hydroxide are in molecular proportions to form, for example, potassium zincate or potassium cadmate. The zinc oxide or cadmium oxide may be used in larger amounts than the molecular ratio to form zincates or cadmates, but no special advantage is obtained by using the larger amounts of the cadmium oxide or zinc oxide.

With these and other features and objects in view, the invention consists in the process of reacting acetylene with thermally and alkali stable alcohols and phenols as hereinafter described and particularly defined in the claims.

The various features of the invention are illustrated in the accompanying drawings, in which Figure 1 is a diagrammatic flow sheet illustrating an apparatus in which the preferred process of reacting acetylene with thermally and alkali stable alcohols and phenols may be carried out; and Figure 2 is a curve illustrating the dilution which must be maintained of the acetylene gas for the reaction to provide a gaseous mixture which is not explosive.

The vinylation of thermally and alkali stable alcohols and phenols in accordance with the present invention may be carried out in the apparatus illustrated in the drawings substantially as follows:

Acetylene which may be derived from any desired source, that is by separation from a gas or generated from calcium carbide, is taken from a receiver 10 and passes through a pressure regulator 12 and a flashback arrester 13 to an orifice meter 14 into a holder 16. Simultaneously while drawing in acetylene to the holder 16 an inert gas, such as methane or nitrogen, is taken from a receiver 18 and passes through a pressure regulator 20 and meter 22 to the holder 16. The nitrogen may be secured by any desired method, preferably by the liquefaction of air.

The mixture of acetylene and nitrogen in the holder 16 is an important feature of the present invention because the handling of acetylene is hazardous on account of the fact that it decomposes with explosive violence.

Referring to Figure 2, is a curve representing the study of the mixture of acetylene with an inert gas to provide mixtures which are safe and those mixtures which are explosive. The ordinates represent the mol concentration of acetylene; while the abscissi represent the total pressure of the mixture of acetylene with an inert gas. The mol percent of acetylene of the ordinates is such that the remainder of the gas in the cylinder where the mixture is being tested is an inert gas such as nitrogen or methane. All mixtures of acetylene and inert gas below the curve 24 are safe mixtures which will not explode. All mixtures of acetylene with inert gas above the curve 26 are explosive. The region between the curves 24 and 26 is a zone in which the acetylene will decompose mildly but will not decompose with explosive violence.

The acetylene-inert gas mixture in the holder 16 are therefore carefully analyzed as to concentration in order to provide a mixture composition which is within the safe region of operation as indicated in Figure 2.

The safe mixture of acetylene and inert gas is drawn from the holder 16 through a line 28 and passes through a flashback arrester 29 to dehydrator 30 to remove water. From the dehydrator the gas mixture passes through a line 32 to a compressor 34 wherein the mixture is compressed to the desired operating pressure. The pressure developed by the pump 34 is generally from fifty to one hundred lbs. higher than the operating pressure under which the vinylation is carried out. The compressed gas flows through a line 36 to a storage reservoir 38; from the storage reservoir 38 the gas under pressure passes to a pressure regulator 40 and line 42 to the reaction chamber 44. A surge tank 46 is connected with the line 42 by which a large volume of gas entering into the vinylation reaction may be supplied to the reactor without noticeable fluctuation in pressure. The acetylene gas mixture flows through a rotameter 47, then enters the bottom of the reaction chamber 44 and flows therethrough countercurrent to a stream of the compound to be vinylated. The compound may be phenol and with this phenol is added the catalyst for promoting the vinylation reaction. The gas passing through the line 32 passes through a filter 33. The acetylene gas passes through a check valve 49 as it enters the reaction chamber.

The phenol is held in a mixing tank 48 and to the phenol is added potassium hydroxide and a metal oxide such as zinc oxide or cadmium oxide. These constituents are actively stirred in the mixing tank to form a slurry and this slurry then flows through a line 50 through a pump 52 by which it is forced through a line 54 into the top of the reaction chamber 44. The reaction between the acetylene and the phenol is exothermic and is preferably maintained at a reaction temperature of 150° to 250° C. To control the reaction temperature the reactor 44 is provided with a jacket 56 through which is circulated Dowtherm from a heat exchanger 58. The Dowtherm flows from the heat exchanger 58 to a pump 60 then through a line 62 to the bottom of the jacket and returns from the top of the jacket through a line 64 to the exchanger 58. Inert gas and unreacted acetylene, together with some of the vinylated phenol passes from the reaction chamber through a vapor line 66 to a water cooled condenser 68. The phenol and vinylated phenol which are condensed in condenser 68, flow back to the reactor while the gas passes through a vapor line 70 and is passed out of the system through a back pressure valve 72 and orifice meter 74. A gauge glass 76 is mounted in the vapor line 70 for the purpose of indicating the levels of liquid phenolic products being vinylated in the reactor 44. The vinylated phenol is continuously or intermittently withdrawn from the reactor through a valved outlet line 78. The reaction products withdrawn through the line 78 contain the vinylated phenol as well as some unreacted phenol and the catalyst. The catalyst and phenol are separated from the vinylphenol ether and vinylphenyl ether is then refined preferably by distillation.

An expansion tank 79 is connected with the line 64 to provide for thermal expansion of Dowtherm in the system.

In place of the reactor 44 autoclaves of the roller type, the shaker type and stirrer type have been used for effectively carrying out the reaction.

The exhaust gas from meter 74 contains acetylene and can be introduced into the holder 16 with the appropriate amount of inert gas to be recycled through the process.

To start the apparatus into operation nitrogen is drawn from tank 80 to provide an inert atmosphere in the reaction chamber before acetylene is introduced into the chamber.

In making up the slurry for the phenol which is supplied to the vinylation reactor, approximately two to six parts by weight of potassium hydroxide to forty-two parts by weight of phenol are used. The amount of zinc or cadmium oxide used preferably has a molar ratio of two, based on the amount of potassium hydroxide employed. This mol ratio of two is the stoichiometric ratio required to produce potassium zincate or potassium cadmate. Using a given ratio of potassium hydroxide to organic hydroxy compound the described ratio of potassium hydroxide to zinc oxide provides a catalyst that appears to give the maximum rate of conversion of the phenol or aryl compound to the vinylphenyl or vinylaryl ether.

It has been found that potassium hydroxide alone will promote the reaction between the hydroxyaryl compounds and acetylene but the rate of reaction is relatively slow. In comparison, the mixture of potassium hydroxide with the zinc oxide or cadmium oxide in the ratio of two will increase the rate of conversion from 50 to 300%.

The pressure which is maintained in the conversion or reaction chamber 44 is preferably 100 to 1500 lbs. per square inch. In actual practice a pressure of 200 to 500 lbs. has been found to be a desirable pressure for operation. The pressure maintained in the conversion chamber is a matter of economics depending upon the cost of compressing the gases, the cost of high pressure equipment and the capacity or output of vinylaryl compounds, etc.

During the conversion operation, a secondary reaction occurs between the vinyl ethers formed and the phenols and alcohols being vinylated. When the reaction products are held in contact with each other for a long period of time the vinyl ethers react with the hydroxy aromatic compounds or alcohols to form acetals. For example, phenol will react with vinylphenyl ether to produce diphenylacetal. This reaction will very materially cut down the yield of vinyl ethers produced and, according to the present invention, the improved catalyst composed of the strong base with the zinc or cadmium oxide speeds up the reaction to such a point that a minimum amount of the acetals is formed in the secondary reaction.

By the present process hydroxyaromatic compounds, such as the phenols, cresols, xylenols and naphthols may be vinylated. Also other mono-, di- and trihydricphenols may be vinylated by this process. It is necessary that the hydroxy compounds shall be thermally and alkali stable to obtain an efficient reaction.

Furthermore mono- and poly-hydric alcohols may be vinylated in accordance with the present process when using the process and catalyst described above. By the vinylation of hydroxy aromatic compounds the following compounds are produced:

Vinylphenyl ether, $C_8H_8O$, which has a refractive index of 1.522, a density $n_D^{20}$ of 0.9778, boiling point 155.6° C. at 734 mm. of mercury, vinylphenyl ether being a water white liquid;

Vinyl-ortho-tolyl ether, $C_9H_{10}O$, having a refractive index of 1.5166, a density $n_D^{20}$ 0.9645, boiling point 116.5° C. at 145 mm. of mercury and is a water white liquid;

Vinyl-3,5-xylyl ether $C_{10}H_{12}O$, having a refractive index of 1.5185, density $n_D^{20}$ 0.9449, having a boiling point of 119.1° C. at 58 mm. of mercury.

By the vinylation of alcohols vinylalkyl-ethers may be formed.

EXAMPLES

*Synthesis of vinyl phenyl ether from acetylene and phenol*

| Charge (solid and liquid) to bomb: | | |
|---|---|---|
| Phenol (E. and A.; C. P.) | 42.0 | 42.0 |
| KOH (E. and A.; pellets; 85.5%) | 3.00 | 3.00 |
| ZnO powder (B and A) | 1.86 | |
| CdO powder (Kahlbaum) | | 2.94 |
| Decalin (Eastman Kodak Co. practical grade) | 100.00 | 100.00 |
| Reaction temperature, ° C. | 224–228 | 220–228 |
| Reaction period, hours | 5.0 | 5.0 |
| Partial pressure of bomb contents with exception of acetylene at 225° C., p. s. i. | 164 | 164 |
| Partial pressure of acetylene employed at 225° C., p. s. i. | 50 | 50 |
| Total initial pressure in bomb at 225° C., p. s. i. ga. | 200 | 200 |
| Amount of vinyl phenyl ether produced, grams | 31.7 | 38.3 |
| Conversion of phenol to vinyl phenyl ether, percent by wt.+ | 59.1 | 71.4 |
| Conversion of phenol to vinyl phenyl ether, wt. percent per hour+ | 11.8 | 14.3 |
| Weight ratio of KOH to phenol | 0.061 | 0.061 |
| Mole ratio of KOH to oxide of metal | 2.0 | 2.0 |

+Based on the total amount of phenol employed.

The preferred form of the invention having been described, what is claimed as new is:

I claim:

1. A process of producing vinyl ethers comprising: reacting at an elevated temperature and pressure in liquid phase acetylene with a thermally and alkali stable hydroxy organic compound selected from the class consisting of alcohols and phenols dissolved in an inert solvent in a non-explosive mixture in the presence of an alkali metal hydroxide mixed with a metal oxide selected from the group of oxides of the metals, consisting of zinc oxide (ZnO) and cadmium oxide (CdO).

2. The process defined in claim 1 in which the reaction is carried out under sufficient superatmospheric pressure to maintain the ether being formed in the liquid phase.

3. The process defined in claim 1 in which the reaction is carried out under pressure of from 5 to 75 atmospheres.

4. The process defined in claim 1 in which the reaction is carried out at a temperature of 100° to 250° C.

5. The process defined in claim 1 in which the reaction is carried out under a pressure from 5 to 75 atmospheres and at a temperature of 100° to 250° C.

6. The process defined in claim 1 in which the organic hydroxy compound is a monohydric phenol.

7. The process defined in claim 1 in which the organic hydroxy compound is a polyhydric phenol.

8. The process defined in claim 1 in which the organic hydroxy compound is an alcohol.

9. The process defined in claim 1 in which the catalytic mixture of alkali metal hydroxide and metal oxide are present in stoichiometric proportions to react with one another.

10. The process defined in claim 1 in which the alkali metal hydroxide is potassium hydroxide.

11. The process defined in claim 10 in which the weight ratio of potassium hydroxide to organic hydroxy compound is between 0.01 and 0.2.

12. The process defined in claim 6 in which the alkali metal hydroxide is potassium hydroxide.

13. The process defined in claim 12 in which the aromatic monohydroxy compound is phenol and in which the weight ratio of potassium hydroxide to phenol is between 0.01 and 0.2.

14. The process defined in claim 13 in which the mol ratio of potassium hydroxide to zinc oxide is two.

15. The process defined in claim 1 in which the solvent is an inert thermally stable hydrocarbon which is a liquid at 5 to 75 atmospheres pressure when at temperatures of 100 to 250° C.

16. A process of producing vinyl ethers comprising: reacting at an elevated temperature and pressure in liquid phase acetylene with a liquefied organic, monomeric hydroxy compound free from alkali sensitive groups and corresponding to the formula

in which X represents either —H, —COOH, —COO-metal, —NY₂, —(OR)n—OH or

—(OR)n—OR groups, R being an aliphatic, hydro-aromatic, aromatic or aralkyl radicle, Y being —H, —R or —ROH and n being nought or any integral number dissolved in an inert solvent in a non-explosive mixture in the presence of an alkali metal hydroxide mixed with a metal oxide selected from the group of oxides of the metals consisting of zinc oxide (ZnO) and cadmium oxide (CdO).

THOMAS H. INSINGER, JR.

REFERENCES CITED

The following references are of record in the file of this patent:

UNITED STATES PATENTS

| Number | Name | Date |
|---|---|---|
| 1,959,927 | Reppe | May 22, 1934 |
| 2,017,355 | Reppe et al. (A) | Oct. 15, 1935 |
| 2,066,076 | Reppe et al. (B) | Dec. 29, 1936 |

FOREIGN PATENTS

| Number | Country | Date |
|---|---|---|
| 430,590 | Great Britain | June 21, 1935 |
| 849,553 | France | Aug. 21, 1939 |

OTHER REFERENCES

Ser. No. 404,522, Wolfrom et al. (A. P. C.), published July 13, 1943.